(12) United States Patent
Biliris et al.

(10) Patent No.: US 7,562,153 B2
(45) Date of Patent: Jul. 14, 2009

(54) METHOD AND APPARATUS FOR CONTENT DISTRIBUTION NETWORK BROKERING AND PEERING

(75) Inventors: Alexandros Biliris, Chatham, NJ (US); Charles D. Cranor, Morristown, NJ (US); Frederick Douglis, Basking Ridge, NJ (US); Cooper Nelson, San Diego, CA (US); Michael Rabinovich, Gillette, NJ (US); Sandeep Sibal, Scotch Plains, NJ (US); Oliver Spatscheck, Randolph, NJ (US); Walter Sturm, Chester, NJ (US)

(73) Assignee: AT&T Intellectual Property II, L. P., New York, NY (US)

( * ) Notice: Subject to any disclaimer, the term of this patent is extended or adjusted under 35 U.S.C. 154(b) by 723 days.

(21) Appl. No.: 09/901,317

(22) Filed: Jul. 9, 2001

(65) Prior Publication Data

US 2002/0078233 A1    Jun. 20, 2002

Related U.S. Application Data

(63) Continuation of application No. 09/678,523, filed on Oct. 3, 2000, now abandoned.

(60) Provisional application No. 60/203,546, filed on May 12, 2000, provisional application No. 60/233,977, filed on Sep. 19, 2000.

(51) Int. Cl.
*G06F 15/16* (2006.01)

(52) U.S. Cl. .................. 709/238; 709/224; 709/217; 709/226; 709/231; 709/232; 709/245; 709/223; 711/133; 711/159

(58) Field of Classification Search ......... 709/237–238, 709/230–233, 204, 245, 250, 223–229, 217, 709/213; 710/38–39, 20; 395/200.3; 718/105; 712/27; 370/396, 701, 400; 726/11, 13
See application file for complete search history.

(56) References Cited

U.S. PATENT DOCUMENTS

| | | | | |
|---|---|---|---|---|
| 5,719,786 A | * | 2/1998 | Nelson et al. | 709/219 |
| 6,070,191 A | * | 5/2000 | Narendran et al. | 709/226 |
| 6,185,619 B1 | * | 2/2001 | Joffe et al. | 709/229 |
| 6,415,323 B1 | * | 7/2002 | McCanne et al. | 709/225 |
| 6,578,066 B1 | * | 6/2003 | Logan et al. | 718/105 |
| 6,640,249 B1 | * | 10/2003 | Bowman-Amuah | 709/228 |
| 6,704,873 B1 | * | 3/2004 | Underwood | 713/201 |
| 6,772,208 B1 | * | 8/2004 | Dutta | 709/225 |
| 6,820,133 B1 | * | 11/2004 | Grove et al. | 709/238 |
| 7,020,698 B2 | * | 3/2006 | Andrews et al. | 709/223 |
| 7,055,173 B1 | * | 5/2006 | Chaganty et al. | 726/11 |
| 7,177,901 B1 | * | 2/2007 | Dutta | 709/203 |

* cited by examiner

*Primary Examiner*—Jude J Jean Gilles (57) ABSTRACT

The present invention provides an architecture that advantageously leverages multiple content distribution networks to provide enhanced services. In accordance with an embodiment of the present invention, a share of content requests are served by each of a plurality of content distribution networks. The fraction of content requests served by a particular content distribution network can be determined dynamically, depending on the offered load or other traffic characteristics.

17 Claims, 4 Drawing Sheets

METHOD AND APPARATUS FOR CONTENT DISTRIBUTION NETWORK BROKERING AND PEERING

CROSS REFERENCE TO RELATED APPLICATIONS

This application is a continuation of "Method and Apparatus for Content Distribution Network Brokering and Peering," Ser. No. 09/678,523, filed on Oct. 3, 2000, now abandoned which claims priority to Provisional Application Ser. No. 60/203,546, filed on May 12, 2000, and Ser. No. 60/233,977, filed on Sep. 19, 2000, the contents of which are incorporated by reference herein.

FIELD OF THE INVENTION

The present invention relates to content distribution in packet-switched networks.

BACKGROUND OF THE INVENTION

Packet-switched networks, such as networks based on the TCP/IP protocol suite, can be utilized to distribute a rich array of digital content to a variety of different client applications. The most popular applications on the Internet today are browsing applications for searching the World Wide Web, e.g. Netscape Navigator or Microsoft Internet Explorer, which utilize the Hyper Text Transfer Protocol (HTTP) to retrieve documents written in the Hypertext Markup Language (HTML) along with embedded content. See, e.g., R. Fielding et al., "Hypertext Transfer Protocol—HTTP/1.1," IETF RFC 2616, Network Working Group, 1999, which is incorporated by reference herein. HTML documents, as well as other resources on the Internet such as embedded multimedia content, are addressed by Uniform Resource Locators (URLs), e.g. "http://www.xyz.com/dir/document.html" which identifies an HTML document, "document.html" on server "www.xyz.com" in directory "dir" which may be accessed using the HTTP protocol. See Berners-Lee, T., et al., "Uniform Resource Locators," IETF RFC 1738, Network Working Group, 1994, which is incorporated by reference herein. Servers/hosts are identified by domain names, e.g. "www.xyz.com", which are part of a loosely hierarchical naming scheme which are mapped into network IP addresses using the Domain Name Service (DNS). See P. Mockapetris, "Domain names—concepts and facilities," RFC 1034, November 1987; P. Mockapetris, "Domain names—implementation and specification," RFC 1035, November 1987; which are incorporated herein by reference. DNS is in essence a distributed database of multiple name servers that maintain and answer queries on mapping between domain names and addresses. Name servers belong to a hierarchy wherein DNS queries are resolved by contacting other name servers and following a delegation/referral chain to an authoritative name server for the queried host. For example, before a client can issue a request for a resource identified in a particular URL, a DNS query must be issued to translate the host name into an IP address that is utilized to establish the connection to the server with the desired resource.

It is often advantageous when distributing digital content across a packet-switched network to divide the duty of answering content requests among a plurality of geographically dispersed servers. For example, extremely popular Web sites on the Internet often provide links to "mirror" sites which replicate the content at a number of locations across the globe, some closer to the particular client requesting the content. A more recent alternative to mirroring has been the use of what are referred to in the art as "content distribution" services. Content distribution services provided by companies such as Akamai Technologies, Digital Island, and Adero utilize architectures for their content provider customers which dynamically redirect content requests to a cache advantageously situated closer to the client issuing the request (such architectures are referred to herein generically as "content distribution networks" or "CDNs" for short). These companies either co-locate caches within Internet Service Providers or deploy them within their own separate networks.

Content distribution offerings differ in the ways they divide the functions and control over request processing between the customer and the CDN platform. There are primarily two alternative content distribution architectures: (1) systems which rewrite URLs in documents to point to the cached content; and (2) systems which rely on outsourcing of DNS lookups. In the former, accesses to a customer's "root" page (such as "www.xyz.com") can be served by the customer's own Web site, but embedded content such as images, music, or movies can be served using a modified URL (referred to herein by the inventors as a "convoluted URL"). Special scripts may be executed by the customer that modify embedded URLs to use the domain name of the content distribution network. In the latter type of content distribution architecture, the content distribution service provides an authoritative DNS name server(s) for part or all of the customer's Web site. For example, "www.xyz.com" may be served by the "xyz" company's own server but "images.xyz.com" might be resolved by the CDN.

Although there are several CDNs in the market today with more likely to appear in the future, there are disadvantages to relying on any one content distribution service. It is often difficult to provision the proper amount of resources for the CDN service while deploying the service fast enough to be able to reach all possible clients with the desired quality, especially where the content provider expects high-load either continuously or in bursts due to a particularly popular event. It is desirable to have a CDN service that is not constrained by its current capacity and footprint and that can build up capacity and footprint as the service grows.

SUMMARY OF THE INVENTION

The present invention provides an architecture that advantageously leverages multiple content distribution networks to provide enhanced services. In accordance with an embodiment of the present invention, a share of content requests are served by each of a plurality of content distribution networks. The fraction of content requests served by a particular content distribution network can be determined dynamically, depending for example on the offered load or other traffic characteristics.

The present invention can be utilized essentially to load-balance across multiple content distribution networks. This is especially advantageous where the content distribution networks are scattered geographically and can better serve different clients in different locations. The inventors refer to such two-way relationships between content distribution networks as content "peering." The present invention can also be utilized to create a clearinghouse for content distribution bandwidth, in essence creating a market for wholesale access to content distribution services which can be utilized or resold. The inventors refer to such activities in general as content "brokering."

These and other advantages of the invention will be apparent to those of ordinary skill in the art by reference to the following detailed description and the accompanying drawings.

DETAILED DESCRIPTION

For clarity and consistency, the following terminology is utilized in the detailed description of the present invention. Companies or other entities that sign up for content distribution service are referred to as "customers" while network clients that access the customer's content, e.g. individual computer users, client proxies, etc., are referred to as "clients." A content distribution network is referred to, for shorthand purposes, as a "CDN" although it should be kept in mind that the present invention is not limited to any particular content distribution architecture. It is in fact an advantage of the present invention that two or more CDNs of possibly radically different architectures can nevertheless utilize aspects of the present invention to cooperatively redirect content requests back and forth. The content repositories in a CDN are referred to as "CDN servers" for short (and are not to be confused with CDN DNS servers).

The partnering CDNs are presumed to have arranged for the reservation of capacity as a part of some separate negotiation process. This process may be automated or merely the result of human-to-human interaction between the CDN operators: in response to a request for a given capacity for a given time interval, a CDN operator can merely identify to which caches traffic can be directed (e.g., by IP address or DNS names). As part of the capacity reservation process, the CDN server caches may also be prepopulated with content for performance reasons (and/or to disambiguate the location of customer data, as further explained below), although the performance benefits of pushing content to the caches prior to access are minimal, since they aid only the first hit (or a few simultaneous hits) to any given resource.

1. Redirection Mechanisms

How clients are redirected will depend on the method within the particular CDN utilized for directing clients. As described in the background, CDN offerings differ in the ways they divide the functions and control over requests processing between the customer and the CDN platform. There are a number of alternatives, although the primary ones utilized in the art today are based on what the inventors refer to as the use of convoluted URLs and DNS outsourcing. The choice of which style is used greatly affects the method of interaction between the two cooperating CDNs, as discussed below.

Figure 1A:
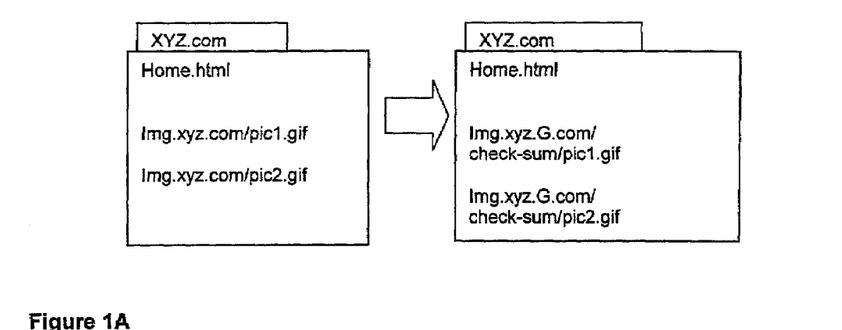
FIGS. 1A and 1B are diagrams illustrating the process of redirection using convoluted URLs.

Convoluted URLs: FIG. 1A illustrates the use of embedded URLs, referred to as "convoluted URLs" by the inventors. The customer retains its entire Web site, XYZ.com, but runs a special script that modifies embedded URLs to use the domain name of the CDN. For example, with reference to FIG. 1A, the HTML page home.html contains URLs pointing to two embedded gif pictures, pic1 and pic2 on the Img.xyz.com server. These URLs are modified to point to a new domain name, i.e. Img.xyz.G.com. Accesses to root pages that use the customer domain name will be served from the customer's Web site, but the embedded objects with the modified URLs will be served by the CDN. The level of complexity of the embedded URLs can vary, but the bottom line is that images and other content served by the CDN all have a URL ending in the CDN's DNS namespace.

Figure 1B:
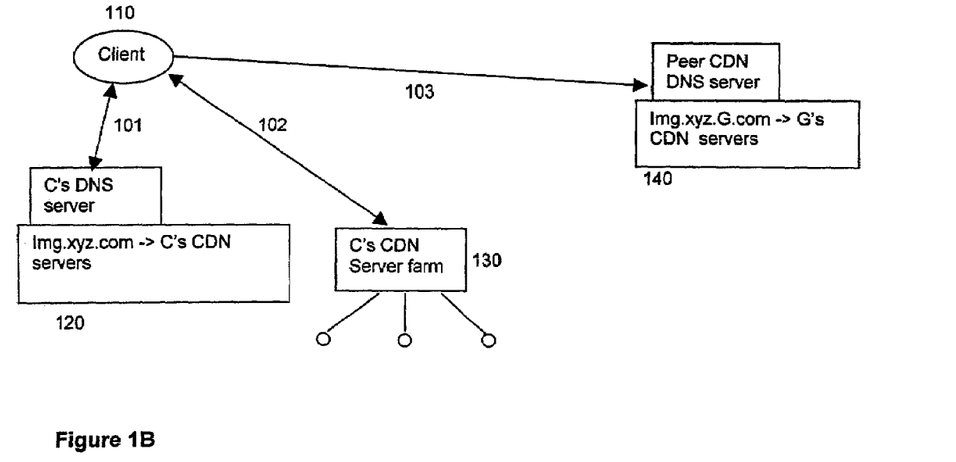

With reference to FIG. 1B, CDN C desires to offload some fraction of requests to CDN G. Convoluted URLs allow an object to refer directly into the CDN G's namespace. Accordingly, at the time of capacity reservation, G should provide the desired URL format for content served from its network. If CDN C has direct access to the content provider's website, e.g. with a proxy through which the root page is accessed by clients, it can dynamically rewrite embedded URLs at the time of access in order to direct different clients to different CDNs. The idea is that as a main page is served to the client, its embedded URLs are dynamically modified to use the format—and in particular the hostname—of G. While theoretically, such rewriting could occur at the customer site as well as at CDN C, in practice only rewriting at CDN is probably feasible. Therefore, this scheme assumes a CDN-first mechanism for client redirection. (Note that if pages are statically rewritten to embed other resources, then there is no opportunity to modify the hostnames of those embedded resources on a per-client basis. In that case, redirection to a particular CDN should probably be performed at the time of the DNS lookup of the embedded URL, as further described below.)

In accordance with a preferred embodiment of the present invention, as shown in FIG. 1B, client requests for embedded content are directed first to C's CDN servers. At step 101, the client 110 resolves the host name portion of the URL using CDN C's DNS system 120 into one of C's CDN server farms 130. At step 102, the client 110 sends the HTTP request to a load-balancing switch in front of the chosen server farm. If content should be redirected to another CDN, the load balancing switch can redirect traffic to a special port number representing G on one of the caches. When a cache receives a request on the port corresponding to CDN G, it knows that the embedded content should be outsourced to G and will rewrite the HTML document using the convoluted URL mapping into G's name space. The embedded URLs are rewritten according to G's format and the rewritten page served to the client. Finally, at step 103, the client will send DNS queries for embedded URLs (and then HTTP requests) to G. All embedded objects from this HTML document will now be fetched from CDN G, as illustrated in FIG. 1B.

Figure 3:
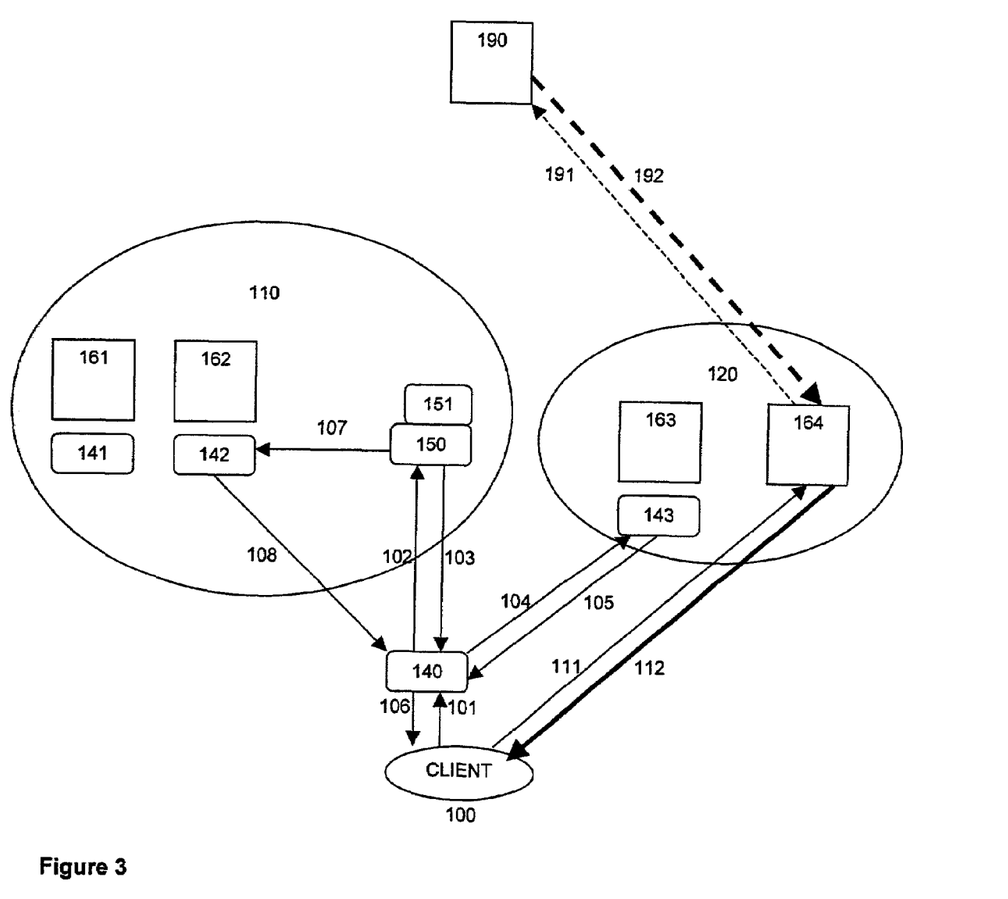
FIG. 3 is a diagram of two content distribution networks configured in accordance with an embodiment of the present invention.

As mentioned above, G needs to provide C with the proper hostname(s) at the time of capacity reservation. In addition, C and G must agree on the format of URLs. Embedding the original URL appears to offer the greatest functionality and simplicity. For example, rather than using a URL like Img.xyz.G.com/check-sum/pic1.gif as shown in FIG. 3, a URL of the form:

foo.G.com/img.xyz.com/pic1.gif can be used to embed the URL img.xyz.com/pic1.gif. The original URL may be easily parsed from this form of modified URL.

Figure 2A:
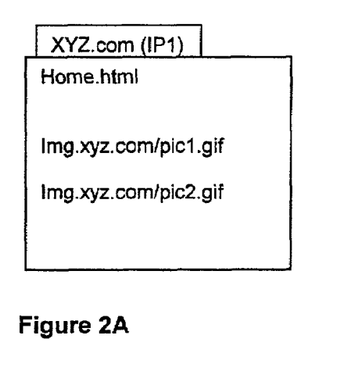
FIGS. 2A and 2B are diagrams illustrating the process of redirection using DNS outsourcing.

DNS Outsourcing. An alternative to the above is the use of DNS outsourcing. The customer retains full control over the entire Web site, and the CDN provides the authoritative DNS server(s) for part or all of the site. For example, with reference to the web page illustrated by FIG. 2A, www.xyz.com may be served by the customer but img.xyz.com might be resolved by the CDN. The entire domain (e.g. xyz.com) could also be served by the CDN, if the customer does not require that it see the first hit. Then, if C resolves the DNS namespace of the customer, or if embedded URLs refer to C's namespace, then C can resolve lookups by some number of clients to redirect traffic to G. This can be done by either resolving a DNS query directly to an IP address served by G, or by using subdomains that redirect another DNS query to G (direct use of a particular IP address in G's domain is probably only possible with very close cooperation between C and G).

Figure 2B:
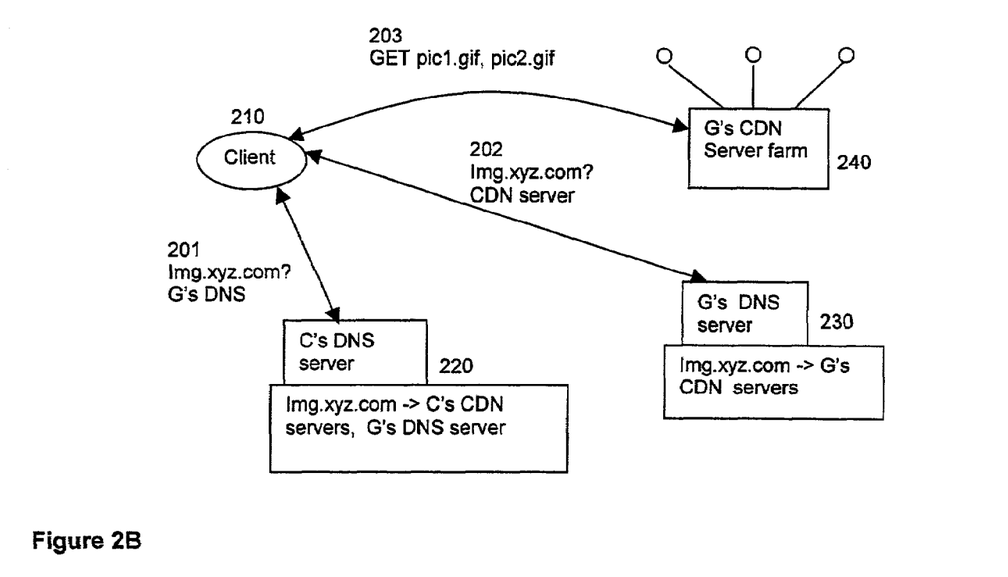

As shown in FIG. 2B, redirection is at the level of domain names. Client DNS queries, e.g. 201, for the domain "img.xyz.com" go to CDN C's DNS server 220. Where CDN C wishes to redirect the content request to CDN G, the DNS server 220 "outsources" the DNS query to G's DNS server 230. G's DNS server 230 answers the client 210's DNS request at 202 with the IP address of CDN server 240 in G's CDN server farm. The client 210 can then issue an HTTP request to obtain the embedded content at 203. It is advantageous for all communications between C and G to be secured, for instance via SSL.

If every URL for a customer is in one domain, such as img.xyz.com, then either every client is referred to a CDN, or the DNS resolver for that domain must send a subset of clients to the particular CDN. One possible method for distinguishing among clients is from the source IP address: send clients to a cooperating CDN G when that CDN has capacity that is "closer" to the clients than C's own caches. Note that if the customer has multiple subdomains, then those subdomains can be load-balanced by shifting a predefined set of subdomains to the cooperating CDN. Regardless of the level of DNS naming, once a client is referred to another CDN, it may be important that the client continue to see that CDN as the IP address corresponding to the hostname in question. One example of this importance is the use of SSL: if CDNs serve SSL-protected content, then a single SSL session will span multiple URLs. (On the other hand, it is not clear that a CDN will redirect SSL requests to another CDN in the first place, because it further extends the trust relationship between the customer and the CDN.)

FIG. 3 illustrates a more detailed example. With reference to FIG. 3, two partnering CDNs 110 and 120 are shown. Client 100 seeks to access content which originates from customer server 190 which may or may not be operated by the customer. The customer has signed up for content distribution services with CDN 110, which in turn wishes to redirect some of the requests to CDN 120. CDN 110 has what the inventors refer to as a "brokering" DNS server 150 which is the authoritative DNS server for the domain of the URLs for the content to be requested.

In accordance with a preferred embodiment of the present invention, the following process occurs:

1. At 101, the client 100 attempts to resolve the domain name in the URL of the content piece which is hosted within the CDN by sending a lookup request to the local client DNS 140.

2. Assuming that the query is a recursive query accepted by the client DNS 140 and that an unexpired DNS response does not already exist in a cache, the client DNS 140 will proceed to contact servers in the domain name system hierarchy in an attempt to answer the lookup request—which may entail contacting a root DNS server to get a referral or a chain of referrals to the address of an authoritative DNS server (where the client DNS 140 is not operating in recursive mode, the client 100 itself will proceed through a chain of referrals in the DNS hierarchy as is well understood in the art). At 102, the client DNS 140 will contact the brokering DNS server 150.

3. The brokering DNS server 150 consults a policy module 151 which makes the decision on whether to offload a content request to another CDN. If the decision is to use CDN 110, then the DNS server will use its normal selection mechanism to choose and return the IP address of a CDN server for the request. If the policy module 151 decides to use CDN 120, the brokering DNS server 150 can resolve the query directly to an IP address served by CDN 120 or delegate resolution of the DNS query to CDN 120. There are several ways in which such redirection can be accomplished:

A record: The brokering DNS server 150 at 103 can return an A record (with a suitable time-to-live (TTL)) which contains the IP address of the content host in CDN 120. Since this is an actual assignment to a (virtual) host, this requires knowledge of the internal state of CDN 120. Since the operator of CDN 120 will likely want control over its own address space for load balancing, autonomy, and perhaps other reasons, direct use of a particular IP address in CDN 120's domain is only possible with close cooperation.

NS record: Server 150 at 103 can return an NS record (with a suitable TTL) which redirects the query to the DNS server 143 of partnering CDN 120. The DNS resolution scheme of the partnering DNS then takes over and ultimately, at 104 and 105, returns an A record indicating the IP address of the CDN server 164 hosting the desired content. This is, in essence, a recursive lookup of the DNS subdomain.

CNAME record: Server 150 at 103 can return a CNAME record (with a suitable TTL) which would contain a new domain name whose authoritative DNS server 143 resides in the partnering CDN 120. The DNS resolution scheme of the partnering DNS then takes over and ultimately, at 104 and 105, returns an A record indicating the IP address of the CDN server 164 hosting the desired content. The hostname, thus, is used essentially as an alias.

4. The client DNS 140 then at 106 forwards the IP address of the selected CDN content server to the client 100.

5. The client 100 at 111 then sends a request for the content to the selected CDN server, e.g. shown in FIG. 3 as server 164 in CDN 120.

6. The CDN server 164 at 112 finally satisfies the client request either by serving the content from its cache or from the origin server if the cache does not have an up-to-date copy of the content.

The NS and CNAME record approaches described above are similar, in that they let CDN 120 perform the final DNS resolution. When returning the final IP address, some CDNs also return the NS record with a specific TTL (and may in fact do this intentionally to "steal" requests), which might result in accesses being directed to CDN 120 longer than CDN 110 intended. In this case, a CNAME record might be necessary. Another approach to avoiding the potential stealing of requests is to utilize what are referred to in the art as "recursive" DNS resolution rather than iterative DNS redirection. Using recursive DNS resolution, the brokering DNS server 150 forwards the DNS query to the outside CDN DNS 143 and receives the response and forwards the response back to the client 100. Note that this exacerbates the originator problem that is addressed by the disambiguation procedures described below.

Other variants on redirection can be utilized that address the potential performance penalty in redirection. It may be possible to "piggyback" on any existing load-balancing scheme that may exist within CDN 110, e.g. where the brokering DNS server 150 is incapable of selecting the right server within the CDN. To save on the additional round-trip due to the indirection introduced by the brokering DNS, a triangular technique can be employed: e.g. the brokering DNS server 150 redirects the query to a local host by rewriting and retransmitting the query packet, shown in FIG. 3 as 107 then 108. This only works if the client DNS server 140 is prepared to receive a response from a DNS server, i.e. 142, other than the one to which it sent out the query (known anti-spoofing defense mechanisms thus may limit the effectiveness of this technique). Likewise, the brokering DNS server 150 can forward the DNS query for an outsourced request to a partner CDN 120 as in the previous variation; however, it uses the IP address of the originator of the query as the source IP address in the query packet headers. The outside CDN DNS 143 will then perform server selection relative to the originator IP address and return the DNS response directly to the originator of the query. The total number of exchanged messages is reduced by one.

2. Disambiguating the Origin Server

In addition to the ability to direct traffic to another network, it is advantageous to name URLs in such a manner that both cooperating CDNs can identify and obtain the resources. Where the CDN acts as a reverse proxy cache, the CDN needs a "back door" to access the content on a cache miss, since the URL http://img.xyz.com/foo.jpg will resolve to an IP address served by the CDN. Either the nameserver or the cache must be able to map img.xyz.com to something like img-real.xyz.com, which would be served by the actual customer XYZ. As an example, one can achieve this back door functionality by assigning two URLs to images, one served by the CDN and one by the original site, and by embedding the latter into the former. For example, the URL of an image may be http://img.xyz.com/foo.jpg/img-real.xyz.com/foo.jpg. This approach works for convoluted URLs but not for simple DNS outsourcing.

When a CDN G sees a request for a customer served by CDN C, G needs to be able to identify that the URL is associated with C, and then it needs to map the given URL into a new URL it can use to retrieve a resource on a cache miss. There are a few ways in which this identification and mapping can be performed:

Table-driven. When negotiating for capacity, C provides G a table of URLs that will be served, along with corresponding origin servers. G might serve xyz.G.com and map that hostname to img.xyz.com based on this table lookup. It would associate xyz.G.com with CDN C.

Semantic mapping. C would transform hostnames automatically, for instance A.B.C.G.com→A.B.com. In this case, the presence of CDN C in the domain name in G's DNS namespace implies that C would serve the same domain name after G is removed, but since G should not go back to C on a cache miss, it has to go directly to the origin server X. The domain name within X must be something other than the one that C is already resolving, to avoid a loop, or (alternatively) C can resolve requests from G to the IP address of the origin server rather than within C or G.

Embedded URLs. As described above, in the case of convoluted URLs an embedded URL can contain both the hostname of a CDN server complex and the hostname of the actual origin server. An example is http://X.G.com/img.xyz.com/picture.jpg. Just as in the previous example, this embedded hostname must resolve to the origin server rather than being outsourced to the CDN. And, the embedded URL must be known by G to be associated with C for billing and security purposes.

3. Brokering DNS Architecture

Figure 4:
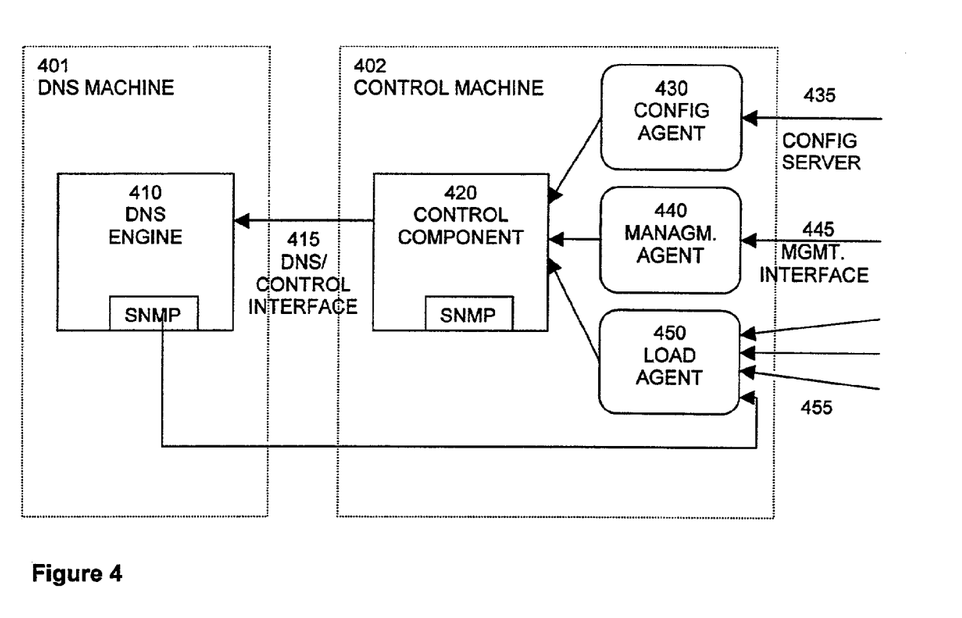
FIG. 4 is a diagram illustrating an architecture for a brokering DNS server.

FIG. 4 illustrates an implementation of a brokering DNS server, in accordance with a preferred embodiment of the present invention. The brokering DNS server comprises a DNS engine 410, a control component 420, and a set of agents 430, 440, and 450. Although the control component and agents are shown in the figure as residing on the same machine with the DNS engine residing on another, there is no limitation on the particular configuration of the different components. It may be advantageous, however, to have one control component drive multiple DNS engines to increase the scalability of the solution.

The agents 430, 440, 450 are used to retrieve information from different sources using various protocols and to convey them as events to the control engine using the agent interface, further described below. The agents shown in FIG. 4 are used to retrieve configuration information, real time management information and live load feeds from different CDNs and IDNS. This information is then sent to the control component 420. The control component 420 is the heart of the brokering DNS system. It gets feedback from other CDNs 455, the DNS engine 410 (via the SNMP interface and the load agent 450), the configuration 430 and a management interface 440. It processes all this information to determine the optimal distribution of CDN resolutions for certain client regions to certain CDNs according to a given policy. This information is then conveyed to the DNS engine 410 using the DNS/Control Interface 415 which stores it in its internal tables. The control component 420 and the DNS control interface 415 are described in more detail below. The goal of the DNS engine 410 is to resolve DNS requests based on the clients DNS server IP address and a set of probability distributions stored in the DNS Engine internal tables. The records returned can be of the type NS or CNAME to redirect the clients DNS server to the DNS server of another partnering CDN. It is also advantageous to have the DNS engine 410 provides a SNMP interface to allow remote components to query the state of the DNS engine and to retrieve feedback about the number of requests resolved to individual CDNs. A more detailed description of the DNS engine is given in the next section.

DNS Engine. The DNS Engine can be implemented as a computer program consisting of the following components: (a) the main loop which waits for network input events and manages timeouts for the DNS/Control interface; (b) the resolver which parses DNS packets and creates and sends DNS response messages; (c) the table manager which efficiently maintains and performs lookups in the in-core database of networks; (d) the DNS/control interface module which parses database updates sent from the IDNS control component to the DNS engine; and (e) the logger which generates a log file of DNS requests received (this can be used for diagnostic and/or accounting purposes). The DNS engine was designed to be small and robust. Since it is a stand-alone process, other components of the system can fail and/or be restarted and the DNS engine will continue to resolve client DNS requests without interruption using its current configuration. Additionally, the DNS engine supports atomic updates to its database, and it continues to respond to DNS requests even when a database update is in progress. These features can be achieved by taking advantage of the copy-on-write memory semantics provided by the UNIX kernel's virtual memory system.

Prior to entering the main loop, the DNS engine initializes the table and interface modules, and then it creates the DNS UDP socket and a listening TCP control socket. Database updates from the control component are sent through this TCP socket. Control updates are processed one-at-a-time in the order they are received (requests received while an update is in progress are queued in the socket listen queue until they can be serviced). The TCP control connection has an inactive timeout to prevent hung control processes from blocking access to the server. The main loop of the DNS engine program operates as follows:

1. wait for a TCP control event or a UDP nameserver packet to arrive (using select). If a TCP control connection is currently open, then the TCP control event will either be inbound data on the control socket, an EOF on the control socket, or an inactive timeout. If a TCP control connection is not open, then DNS engine selects on the listening TCP socket for a new control connection. Currently we only allow control connections from the local host (allowing network-based control connection requires additional authentication mechanisms).
2. check for a TCP control event. If a control connection is not currently active and a TCP event occurs, then we have a new TCP control connection that should be accepted. Otherwise, we have an event associated with a control connection that has already been established. If an inactive timeout or error occurs, we close the connection and listen for a new connection the next time through. If we receive data, then we write it to a temporary file and continue. Finally, if we receive an EOF on the control connection, then we start processing the request (described below).
3. check for a UDP event. We receive the packet, parse it, and then make a query to the table module. If the query fails, we send a DNS error packet. Otherwise, we respond to the packet using A, NS, CNAME, or triangle (as specified in the database).
4. goto 1.

When the DNS engine receives a connection on its control socket from the control component, it creates a temporary file and starts spooling the update comments into it. When the DNS engine reads an EOF (indicating the end of the control messages), it forks. The parent and child processes communicate with each other through a pipe. After the fork, the child process continues processing DNS requests using the copy-on-write of the database it has in-core. In the mean time, the parent process calls the interface module to parse and update its copy-on-write copy of the database. If the interface module detects an error, then the parent process informs the child process that it should take over as the main DNS nameserver and the parent process exits. On the other hand, if the interface module successfully updates the in-core database in the parent process, then it informs the child process that it should exit. Once the child exits, the parent resumes answering DNS requests, using the updated database. In either case, the parent process writes a status code to the TCP socket connected to the IDNS Control component before closing it so that the rest of IDNS will be aware of the success (or failure) of the update.

Internally the DNS engine stores information in three types of data structures: (1) Region Table—The region tables cluster a set of IP addresses into a region. For example the region table entry for de would contain all the IP addresses (specified as networks) of Germany. The DNS engine allows the fast matching of a given IP address into the region table with the longest prefix match. (2) Coverage Tables—There are multiple coverage tables each being representative for a set of CDNs. Each of those coverage tables contains one entry per region which specifies what type of resolution should be used (triangular, A, NS, CNAME) and to which CDN a DNS request should be resolved. (3) Customer Table—The customer table associates customers defined by their DNS name with the coverage table. The reason for this level of indirection is that a coverage is determined by the CDN's involved and that the same set of CDN's is likely to be used by multiple customer.

Using those tables the DNS engine performs the following steps for a DNS resolution using the table module.

Match client DNS server's IP address into region using region table.

Match request to a coverage using the DNS name requested and the customer table.

Select one of the resolutions specified in the selected coverage table and region using the probabilities specified in the coverage table.

The details of the data structures will become more apparent in the next section, which describes the interface between the DNS engine and the control component.

DNS-Control Interface. This section describes the interface between the DNS engine and the control module. As alluded to above, it is not assumed that there is a one-to-one mapping between these two components or that those two components are implemented on the same hardware. Updates to the DNS engine are transaction based, as previously described. A transaction is started by the control module opening a TCP connection to the DNS engine. The control module then transfers all updates. If the control-to-DNS engine half of the connection is closed the DNS engine will try to commit the transaction. If the commit is successful the DNS engine reports a success back to the control module. Otherwise an error is reported. If the connection is reset at any point the transaction is considered aborted.

The commands available the control module allow the creation and modification of the three major DNS engine data structures which are described in the previous section. The control module can also reset the DNS engine to the same state the DNS engine had after startup. For easy debugging, it is preferable and advantageous that all commands are transferred in ASCII using the following syntax:

```
<action>: := [
    <prob> = <lookup>;
    ...
    ]
<lookup>: :=
    <type>:<res>
<res>: := <namebase> <dnsserver> | <dnsserver> | <hostip>
<hostip>: := <ip>
<dnsserver>: := (<servername> <ip>), | <dnsserver> | <dnsserver>
<namebase> : := <name>
<type>: : = A|N|T|C
<prob>: :=int
<servername>: :=<name>
<name>=char [ ]
<region>: :=
    REG <name> {
        <addr>,<prefixlen>;
        ...
    }
<addr>: :=<ip>
<prefixlen>: :int
<ip>: := int.int.int.int
<coverage>: :=
    CVG <coverage_name> {
        <region_name>,<action>;
        ...
    }
<region_name>: :=<name>
<coverage_name>: :=<name>
<customer>: :=
    CST <domain_name> {<coverage_name>;}
<domain>: :=<name>
```

-continued

```
<add>: : = ADD | <region>|<coverage>|<customer>!
<update_coverage>: := UPDATE CVG <coverage_name> ,
        <region_name> : <action>!
<del>: := DEL <name>:<name_type>!
<reset>: := RESET !
<name_type>: := REG|CVG|CST
<transaction>: := <add>|<del>|<update_coverage>|<reset>|
        <transaction> <transaction>|END
```

Control Component. The control module consists of the following types of entities: Content Distribution Networks (CDNs), and Customers. In addition, the control module maintains a table that given a client's region and our customer's DNS name describes the CDNs the request should be directed to; it then calculates the set of tables needed by the DNS engine using the load balancing algorithm whenever a change occurs. All inputs in the control module are retrieved in a main event loop, which in each iteration processes one event that was generated by one of the agents.

The load balancing algorithm should fulfill the following constraints. First, it is advantageous to have some client location mechanism such that clients can be clustered into regions before being presented to the algorithm, e.g. where the clients are identified by DNS IP address. Second, it is advantageous for the CDN's to provide the following timely feedback to the algorithm:

Presence of CDN in networks specified as C-net masks.
    Mapped to regions before given to algorithm.
The availability of resources in a network as specified by a
    C-net mask and mapped to a region. Resources:
    Available capacity for us
    Bandwidth utilized by us
    Number of hits by us
Aggregate resource usage/capacity of:
    Available capacity for us
    Bandwidth utilize by us
    Number of hits by us
    Number of DNS resolutions for us
Past resolutions done on broker The goal of the algorithm is to determine the mapping of (region,cdn) to prob. Which means that a client in the specified region will be redirected to a particular CDN with the given prob. providing: flash crowd protection and optimal proximity. For each region, the sum of the prob. over all CDNs has to be 1. Each region has to have enough available capacity at each point in time regardless of achieving the proximity goal.

Given the number of variables, the lack of predictability of client demand, and the possibility of stale and incomplete feedback, the design of a robust and scalable control algorithm is a non-trivial task. Nevertheless, as a first approximation, the algorithm can take the following steps:

Eliminate all CDNs that are overloaded when considering
    where to send a client to,
Identify those CDNs that have a good coverage for the
    region the client comes from, and
Distribute the load among such CDNs based on any information we may have on available capacity.

While this algorithm is sub-optimal, it may be a reasonable approximation if the load that we place on partnering CDNs is relatively small.

The problem addressed by client clustering is to group all possible clients into regions so that the DNS will know, for any request, from which region this request is. There are several steps in preparing client clustering:

1. Prepare a list of all possible Internet destinations;
2. Obtain mapping of these destinations to regions;
3. Compress the result by grouping adjacent IP addresses that map to the same region into a single entry. The entry contains an IP address of one of the destinations in the group and the prefix length providing the number of senior (left-most) bits in the address that are significant. Any destination with the matching address prefix will be mapped to this region.

We fulfill the first step by extracting all destinations in a BGP table of one of Worldnet BGP routers. The second step is done by executing a script that for each entry in the Internet destination list, queries NetGeo service and obtain the geographical address for this destination. The third step uses IP address prefixes from the BGP table as well as the ranges of valid IP addresses for a given geographical address from NetGeo.

Our current notion of regions is that regions correspond to countries. The overall result of client clustering is the list of this form:

```
FRANCE {
    198.54.234.0, 23;
    209.88.72.0, 21;
    . . .
}
GERMANY {
    196.8.0.0, 16;
    192.96.38.0, 24;
    . . .
}
```

The list contains a set of entries for each region. The first item in each entry represents an IP address and the second the number of left-most bits in the Ip address that are significant. For example, the first entry in the German region above specifies that all IP addresses in the range of 196.8.0.0—196.8.255.255 belong to the German region.

The following definitions can be used in the control module.

MAX_NUM_OF_CDNS. The maximum number of CDNs the system can handle.
MAX_CDN_NAME_LEN. The maximum length of CDN name.
MIN_CDN_LOAD_VALUE and MAX_CDN_LOAD_VALUE. The valid range of CDN's load value.
MIN_CDN_CVRG_VALUE and MAX_CDN_CVRG_VALUE. The valid range of CDN's coverage value for a particular region.
MAX_NUM_OF_REGIONS. The maximum number of regions the system can handle.
MAX_NUM_OF_CUSTOMERS and MAX_CUSTOMER_NAME_LEN. The maximum number of customers the system can handle and the maximum length of a customer's name.

The CDN type can be defined as follows:

```
typedef struct {
    char id;
    int load;
    int capacity;
    int rel_capacity;
    char name [MAX_CDN_NAME_LEN+1];
```

```
        char resolution [MAX_RESOLUTION_LEN+1];
        Coverage cvrg [MAX_NUM_OF_REGIONS];
} CDN;
```

Where id is the id of the CDN, load its current load, capacity its current maximum capacity, rel_capacity its relative capacity (defined as its capacity divided by the capacity of all CDNs), name its name, resolution its resolution expressed as a null terminated string, and cvrg gives the quality of coverage of a particular CDN on a given region and its type is as follows:

```
typedef struct {
        char reg_name [MAX_REGION_NAME_LEN+1];
        char cvrg;
} Coverage;
```

The following functions can be advantageously supported:
   int cdn_add(char* name, int cap, char* res, Coverage* cvrg, int len)

It adds a new CDN with name name, total capacity cap, a resolution res expressed as a null terminated string, and an array cvrg of this CDN's coverage of regions and the length len of this array. It returns 0 on success, non-zero on failure.
   int cdn_update_cvrg(char* name, Coverage* cvrg, int len)

It updates the coverage data for an existing CDN with name name; The new array of coverage is specified in cvrg and the array's length in len. It returns 0 on success, non-zero on failure.
   int cdn_update_capacity(char* cdn_name, int cap)

It updates the capacity for an existing CDN with name name to cap. It returns 0 on success, non-zero on failure.
   int cdn_remove(char* name)

It removes the CDN with name name. It returns 0 on success, non-zero on failure.
   CDN* cdn_lookup(char* name)

It returns a pointer to the CDN structure of the CDN with name name. On failure, it returns a null pointer.
   int cdn_load_set(char* name, int load)

It sets the load of the CDN with name name to load. It returns 0 on success, non-zero on failure.
   The Customer can be defined as follows.

```
typedef struct {
        char name [MAX_CUSTOMER_NAME_LEN+1];
        uint mask;
} Customer;
```

Where, name is the customer's name and mask is a bitmap, one bit per CDN. A set bit indicates that traffic to this customer may go through the corresponding CDN. The following functions can be supported.
   int customer_add(char* name, char** cdn_name, int len)

It adds a customer with name name in the system. The names of the CDNs that can serve this customer is in cdn_name and len is the length of this array of names. It returns 0 on success, non-zero on failure.
   int customer_upd_cdns(char* name, char** cdn_name, int len)

It updates the list of CDNs that can serve customer with name name. It returns 0 on success, non-zero on failure.
   int customer_remove(char* name)

It removes the customer with name name. It returns 0 on success, non-zero on failure.

Control-Agent Interface. As described in the overview section, the goal of an agent is to retrieve information from an outside source like a directory server, web interface or performance monitor of a CDN using the appropriate protocol to parse this information and to convey the result in a format understandable by the control module to the control module. In particular, agents hide the details of the interface necessary to retrieve load information from CDNs.

The interface between control and agents assumes that both the control module and the agents are running on the same machine. Each agent is implemented as one process sharing a memory region and a socketpair with control. The memory region is used to transfer data from the agents to control and the socketpair is used to signal the availability of data to control. Below we will discuss the interfaces to the three agents available in the first prototype.

The Config Interface retrieves configuration information after control boots or control is reset. The following events are understood by the agent:
   IDNS_REQUEST_AT_ASCII_CONFIG. Sent from control to the agent requesting events representing all configuration information. This event has no data section.
   IDNS_AT_INIT_DONE. Sent from the agent to control telling control that all configuration information has been sent to control in prior events. This event has no data section.
   IDNS_AT_ADD_CDN. Sent from the agent to control. Adds CDNs to controls data structure. This event's data section contains an ASCII list of CDN information encoded in the following syntax:

```
<cdn_add> : :=
        ADD CDN <name>:<total_capacity> {<lookup>} [ <regcov_list>
]!
<lookup>: :=
        <type>:<res>
<res>: := <namebase> <dnsserver> | <dnsserver> | <hostip>
<hostip>: := <ip>
<dnsserver>: := (<servername> <ip>), | <dnsserver> | <dnsserver>
<namebase> : := <name>
<servername>: :=<name>
<name>=char
<type>: := A|N|T|C
<regcov_list>: := <region_name>:<coverage>; | <regcov><regcov>
```

IDNS_AT_ADD_CUSTOMER. Sent from the agent to control. Adds customers to controls data structure. This event's data section contains an ASCII list of Customer information encoded in the following syntax:

```
<customer_add> : :=
        ADD CST <name> [<cdn_list>]!
<cdnlist>: := <cdn name> | <cdnlist>;<cdnlist>
```

IDNS_AT_ADD_REGION_TABLE. Sent from the agent to control. Adds an entire region table to controls data structure. This event's data section contains an ASCII list of Customer information encoded in the following syntax:

```
<region_add>: :=
    ADD REG <name> {
        <addr>,<prefixlen>;
        ...
    }!
<addr>: :=<ip>
<prefixlen>: :int
<ip>: := int.int.int.int
```

The purpose of the Configuration Agent is to retrieve configuration information from a configuration server hiding the protocols required to do so. Currently the configuration agent simply reads configuration information from disk after receiving a IDNS_REQUEST_AT_ASCI_CONFIG event. It will read the files./regions.txt, ./cdn.txt, ./customer.txt and generate the events IDNS_AT_ADD_REGION_TABLE, IDNS_AT_ADD_CDN, IDNS_AT_ADD_CUSTOMER respectively. The content of the files is simply passed as event argument and has to be in the appropriate event data format. No syntax or semantic checks are currently performed in the agent. After the three events have been acknowledged by control the agent generates a IDNS_AT_INIT_DONE event to signal to control that all configuration information has been successfully retrieved.

The Load Agent provides load information retrieved from different CDNs. The following events are understood by the agent:

IDNS_AT_LOAD. Sent from the agent to control. Provides load information in kByte/sec for a single CDN (either total or for a particular region). The information is encoded using the following ASCII syntax:

```
<load> : :=
    LOAD <cdn_name>,<region>:<load_kbit>!
    LOAD <cdn_name>,CDNTOTAL:<load_kbit>!
```

IDNS_AT_CAPACITY. Sent from the agent to control. Used to change the capacity we have for a certain CDN (either total or in a region). The argument is ASCII encoded and represents kBits/sec of the used and unused capacity available using the following syntax. The unused available capacity is unused_capacity=capacity-load.

```
<cdn_change> : :=
    CAPACITY <cdn_name>,<region>:<capacity>!
    CAPACITY <cdn_name>,CDNTOTAL:<capacity>!
```

The Management Interface is used to change the control data structure during runtime. The management interface will be contacted by a Web server running a CGI script that allows the change of CDN capacity and the management of user information. One method of contacting the agent is via TCP and the information can be encoded in the event specific ASCII format. The following events are understood by the agent:

IDNS_AT_RESET. Sent from the agent to control. Resets control which will trigger a reset of DNS and a reload of all configuration information. No arguments.

IDNS_AT_CAPACITY. Sent from the agent to control. Used to change the capacity we have for a certain CDN (either total or in a region). The argument is ASCII encoded and represents kBits/sec of the used and unused capacity available using the following syntax. The unused available capacity is unused_capacity=capacity-load.

```
<cdn_change> ::=
    CAPACITY <cdn_name>,<region>:<capacity>!
    CAPACITY <cdn_name>,CDNTOTAL:<capacity>!
```

IDNS_AT_ADD_CUSTOMER. Sent from the agent to control. Adds customers to control's data structure. This event's data section contains an ASCII list of Customer information encoded in the following syntax:

```
<customer_add> ::=
    ADD CST <name> [<cdn_list>]!
<cdnlist>::= <cdn_name>; | <cdnlist><cdnlist>
```

IDNS_AT_REMOVE_CUSTOMER. Sent from the agent to control. Removes customers from controls data structure. This event's data section contains an ASCII list of Customer information encoded in the following syntax:
<customer_remove>::=DEL CST <name>!

4. Status Reports

As described above, it is advantageous to have a capability to get updates about current load, in order to determine how much of the reserved capacity is available to the CDNs. Regardless of the exact method of redirection, the fraction of requests directed is dependent on the prior negotiation process between the CDNs and can be made dependent on ongoing feedback between the CDNs about the bandwidth currently being used.

There are two modes of interaction between the offloading and granting CDNs, referred to as C and G respectively. We assume that these interactions are over SSL, due to the need to balance the needs of simplicity and security. A special port may be assigned for these interactions, and some additional Access Control and Authentication may augment the base protocol. The HTTP requests and responses may contain optional headers (as specified in HTTP/1.1), but these will be ignored by the protocol. We refer to the party within C that is obtaining these status reports as the load agent.

Offloader-initiated queries: This is the usual way in which load information from the granting CDN is gathered by the load agent in the offloading CDN. Here, the load agent issues requests to the CDN and gets the load information in the response. This will likely be done in a periodic fashion, though the protocol does not require a particular rate or even repetition.

The query is a HTTP GET Request, and has the form (in BNF):

```
"GET" SP ( load-query | capacity-query )
    [ "&" time-period] SP "HTTP/1.1" CRLF CRLF
load-query = "/load?" ("aggregate" | region-query)
capacity-query = "/capacity?" ("aggregate" | region-query)
region-query = ("region=all" | "region=" region-set)
region-set = "(" REGION-ID *("," REGION-ID) ")"
REGION-ID = 1*(DIGIT|a-z|A-Z|".")
time-period = 1*DIGIT
```

Note, CRLF is shorthand for a carriage return (CR) followed by a line feed (LF). The query in the GET header expresses what type of load or capacity information is being requested, and over what time period (in seconds) this information is being asked for. The time period defaults to 300 (5 minutes), if it is not declared explicitly. The load and capacity in some cases may be inferred from one another. However the protocol does not assume or depend on any such relationship. The load-query requests the current load that C exerts on G. The capacity-query requests the available capacity that G can make available to C. These queries may pertain to the aggregate (across the entire CDN), or may pertain to specific regions (whose Ids have been previously agreed on). In a situation where load information of all regions is required, there is a more compact "region=all" query.

An example GET request issued by C to G for the load of G's servers in region france averaged over the past 200 seconds would be:

GET/load?region=france&200 HTTP/1.1 CRLF CRLF

A subtle point is that while the sum of all regional loads should add up to the aggregate load, the sum of all regional available capacities will be more than or at least equal to the aggregate available capacity. The aggregate available capacity is the balance of capacity left for C to use as per its contract with G.

The response from G is an HTTP GET Response. If the request is not understood, a 400 Error Response results. A more detailed response explaining the nature of the error may be supported in a future version of this protocol. If the request was successful, a 200 OK Response results. The body of the response has the following form (in BNF):

```
"Load" SP load-message | "Capacity" SP capacity-message
    | "Unavailable"
load-message = "aggregate" load | region-load
region-load = REGION-ID "=" load *("," REGION-ID "=" load)
load = 1*DIGIT [ "," hits-per-sec]
hits-per-sec = 1*DIGIT
capacity-message = "aggregate" capacity | region-capacity
region-capacity = REGION-ID "=" capacity *("," REGION-ID "=" capacity)
capacity = 1*DIGIT
```

These are fairly self-explanatory. The "Unavailable" response indicates that the requested information is absent, which may be for a variety of reasons. The load and capacity queries are in units of kbps. This load metric may further be augmented by providing the number of hits per second as is described above. The protocol may in the future also support other metrics. The body of an example response from G to C corresponding to the example GET request discussed earlier, if the load in "france" was 20 kbps would be:

Load france=20

If in addition the number of hits/sec was 47, the response would be:

Load france=20,47

Grantor-initiated alerts: This is an emergency mechanism for the granting CDN to alert the Load about an event requiring immediate action—most likely some overload condition.

The alert message is sent to the Load Agent to a known port number (perhaps well-known), where presumably an HTTP daemon is running. The alert should use SSL and the HTTP POST method. The header of the POST for the CDN alert has the following form (in BNF):

"POST" SP "/alert" SP "HTTP/1.1" CRLF CRLF

An example POST message header would then be:

POST/alert HTTP/1.1 CRLF CRLF

This is followed by the body of the POST message, which has the following form (in BNF):

```
CDN-ID SPACE ("Load" SP load-message
    | "Capacity" SP capacity-message | "Unavailable")
CDN-ID = 1*(DIGIT|a-z|A-Z|".")
```

The CDN originating the alert identifies itself by the CDN-ID, which has been agreed upon a priori. The "Unavailable" message indicates that something serious has occurred, and the CDN in question is unable to serve requests that are directed to it for C's customers. The load-message is described earlier. Here it provides load information that has caused the alert, which is most likely due to a sudden overload situation caused by traffic from C. The capacity-message similarly provides capacity information that has caused the alert, which is most likely due to a sudden loss of capacity. An example body of the POST from CDN G (identified simply by the letter "G") for a load alert notifying that region France is suffering a load of 50000 kbps, and a hit rate of 8800 hits/sec, would then be:

G Load france=50000,8800

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been described with particular regard to the IP networks and the World Wide Web. However, the principles of the present invention could be extended to other packet-switched network protocols and other content distribution formats. Such an extension could be readily implemented by one of ordinary skill in the art given the above disclosure.

What is claimed is:

1. A method of serving content in a packet-switched network comprising:

choosing from a plurality of content distribution networks which content distribution network will respond to a content request from a client;

redirecting the client to the chosen content distribution network by rewriting a pointer embedded in a document as a rewritten pointer before serving the content to the client so that the content request will be served by the chosen content distribution network as indicated by the rewritten pointer and wherein one of the plurality of content distribution networks is chosen only if a measured load of the one of the plurality of content distribution networks does not exceed a predetermined capacity reserved on the one of the plurality of content distribution networks.

2. The method of claim 1 wherein the content distribution network is chosen based, at least partly, on a determination of which of the plurality of content distribution networks is closer to the client.

3. The method of claim 1, wherein the pointer to the content is rewritten to point to a server in the chosen content distribution network.

4. The method of claim 1, wherein the pointer to the content is rewritten to point to a domain name served by the content distribution network.

5. The method of claim 1, wherein the pointer to the content is rewritten so that an original reference may be readily parsed from a corresponding one of the rewritten references.

6. The method of claim 1, wherein the chosen content distribution network utilizes the corresponding one of the rewritten references to obtain the embedded content if the chosen content distribution network does not have an up-to-date copy of the embedded content in a cache.

7. The method of claim 1 wherein redirecting the client to the chosen content distribution network further comprises resolving domain name system queries to content served by the chosen content distribution network.

8. The method of claim 7 further comprising answering the domain name system queries with a network address of content served by the chosen content distribution network.

9. The method of claim 7 further comprising answering the domain name system queries with a network address of a domain name system server responsible for the chosen content distribution network.

10. The method of claim 7 further comprising answering domain name system queries with a domain name of content served by the chosen content distribution network.

11. The method of claim 7 further comprising forwarding the domain name system queries to a domain name server responsible for the chosen content distribution network and which directly answers the domain name system queries.

12. The method of claim 1, wherein the content distribution network serves the content request from a local cache and wherein the content distribution network has access to a second copy of the content if there is a cache miss.

13. The method of claim 12, wherein the content distribution network includes a table of associations between references to content served by the content distribution network and references to a second copy of the content served from elsewhere in the network.

14. The method of claim 12 wherein the content distribution network transforms references to content served by the content distribution network into second references to a second copy of the content served from elsewhere in the network.

15. A system comprising:
  means for choosing a content distribution network from a plurality of content distribution networks for responding to a content request from a client; and
  means for redirecting the client to the chosen content distribution network by rewriting a pointer embedded in a document as a rewritten pointer before serving the content to the client so that the content request will be served by the chosen content distribution network as indicated by the rewritten pointer and wherein
  the means for choosing a content distribution network from a plurality of content distribution networks for responding to a content request from a client is configured to choose a content distribution network only if a measured load of the content distribution network does not exceed a predetermined capacity reserved on the content distribution network.

16. The system of claim 15, further comprising:
  means for serving content from a local cache; and
  means for serving content from a second copy of the content when the means for serving content from a local cache experiences a cache miss.

17. The system of claim 16, further comprising:
  means for transforming references to content served by the content distribution network into second references to the second copy of the content served from elsewhere in the network.

* * * * *